(12) United States Patent
Takiguchi et al.

(10) Patent No.: US 7,014,677 B2
(45) Date of Patent: Mar. 21, 2006

(54) IRON BASED SINTERED BODY EXCELLENT IN ENVELOPED CASTING PROPERTY IN LIGHT METAL ALLOY AND METHOD FOR PRODUCING THE SAME

(75) Inventors: Hiroshi Takiguchi, Tochigi-ken (JP); Teruyuki Oda, Shinjuku-ku (JP)

(73) Assignees: Nippon Piston Ring Co., Ltd., Saitama (JP); Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/743,325

(22) Filed: Dec. 23, 2003

(65) Prior Publication Data
US 2004/0182200 A1    Sep. 23, 2004

(30) Foreign Application Priority Data
Dec. 25, 2002   (JP) ............................. 2002/374650

(51) Int. Cl.
*B22F 3/00*     (2006.01)
(52) U.S. Cl. .............................. 75/243; 75/231; 75/246
(58) Field of Classification Search ................ 75/231, 75/243, 246
See application file for complete search history.

(56) References Cited

U.S. PATENT DOCUMENTS

| | | | |
|---|---|---|---|
| 4,648,903 A * | 3/1987 | Ikenoue et al. ............... 75/230 |
| 5,007,956 A * | 4/1991 | Fujita et al. .................. 75/238 |
| 5,082,433 A * | 1/1992 | Leithner ...................... 419/11 |
| 5,158,601 A * | 10/1992 | Fujiki et al. ................. 75/246 |
| 5,370,725 A * | 12/1994 | Kawamura et al. ........... 75/243 |
| 5,534,220 A * | 7/1996 | Purnell et al. ................ 419/45 |
| 5,858,056 A * | 1/1999 | Fujine et al. ................. 75/236 |
| 5,861,565 A * | 1/1999 | Omiya et al. ................. 75/243 |
| 6,139,599 A * | 10/2000 | Takahashi et al. ............ 75/246 |
| 6,534,191 B1 * | 3/2003 | Yamauchi .................... 428/550 |

* cited by examiner

Primary Examiner—Ngoclan T. Mai
(74) Attorney, Agent, or Firm—Crowell & Moring LLP

(57) ABSTRACT

The object of the invention is to provide an iron based sintered body suitable for being enveloped in light metal alloy such as an aluminum alloy by casting, and a method for producing the same. A mixed powder is prepared by mixing an iron based powder, a copper powder and a graphite powder blended so that the Cu content and the C content are 5 to 40% by mass and 0.5 to 2.5% by mass, respectively, in the mixed powder. A lubricant powder and a fine particle powder for improving machinability may be further added in the mixed powder. Then, the mixed powder is filled into a mold formed to a green compact, and is sintered into a sintered body so that the sintered body has a desired average thermal expansion coefficient. The surface of the sintered body may be adjusted to have a surface roughness Rz of 10 to 100 $\mu$m optionally by applying a shot blast treatment or by a shot blast treatment and an additional steam treatment. This process permits the sintered body to be enhanced in an adhesive property and bonding strength while being improved in enveloping casting property when the sintered body is enveloped in the light metal alloy by casting. A martesitic stainless steel powder or ferritic stainless steel powder may be used instead of the pure iron powder, or Cr, Mo and W powders may be further blended.

11 Claims, 2 Drawing Sheets

IRON BASED SINTERED BODY EXCELLENT IN ENVELOPED CASTING PROPERTY IN LIGHT METAL ALLOY AND METHOD FOR PRODUCING THE SAME

BACKGROUND OF THE INVENTION

1. Field of the Invention

The invention relates to an iron based sintered body, particularly to an iron based sintered body excellent in enveloped casting property in a light metal alloy. The iron based sintered body is used as being enveloped in a light metal alloy member such as an aluminum alloy by casting.

2. Description of the Related Art

Automobile parts made of an aluminum alloy as a kind of light metal alloys are widely used for making the automobile parts lightweight and for enhancing heat-release ability thereof. However, the aluminum alloys are insufficient in material characteristics as automobile structural members including poor mechanical properties such as strength, wear resistance and rigidity as well as high thermal expansion coefficient as compared with usually used cast iron.

For improving the material characteristics of the aluminum alloy members, different kind of materials are enveloped in the aluminum alloy member by casting such as, for example, gravity casting and die casting, or the aluminum alloy member is compounded with different kind of materials.

For example, Japanese Patent Application Laid-Open (JP-A) No. 60-219436 proposes an engine block having a bearing member of an aluminum alloy housing cap which is formed by enveloping an iron based material by casting. The aluminum alloy housing cap is attached under a main body of an aluminum alloy cylinder block. According to the art described in JP-A No. 60-219436, the mechanical strength is enhanced to an extent not attainable by using only the aluminum alloy with a large improvement of rigidity, and a proper amount of the clearance change by a difference of the thermal expansion coefficient between the bearing and the crank shaft is maintained.

Japanese Utility Model Application Laid-Open (JP-U) No. 63-150115 proposes a crank shaft supporting member of an internal combustion engine made of a light metal alloy. The inside of a portion of the supporting member partitioned with a center lines of bolt holes for mounting on a cylinder block and a curved crank journal supporting surface is reinforced with reinforcing fibers.

JP-A 2001-276961 describes an art for producing a composite member impregnated with an aluminum alloy by a casting method, wherein molten aluminum alloy is allowed to permeate into a porous metal premolded body containing 10 to 40% by weight of chromium in iron or iron based alloy with a given time lag after completing injection of molten aluminum.

Japanese Patent Application Publication (JP-B) No. 2-30790 proposes a method for producing an aluminum alloy casting by applying an intermetallic compound forming treatment, wherein a porous metal body is placed in a mold, the porous metal body is enveloped in an aluminum alloy by casting by a high pressure solidification casting method, and a layer of a compound between aluminum and metal element of the porous metal body is formed by heating at 450 to 550° C. According to the art described in JP-B No. 2-30790, a high bonding strength between the porous metal body and aluminum alloy is obtained with improved durability.

SUMMARY OF THE INVENTION (1) An iron based sintered body having a composition comprising, in % by mass, 0.5 to 2.5% of C, 5 to 40% of Cu, and the balance being Fe and inevitable impurities, a structure containing pores and free Cu phases dispersed in a matrix, an average thermal expansion coefficient from room temperture to 200° C. of $13.5\times10^{-6}/°$ C. or less, and a surface roughness Rz of 10 to 100 µm, and being excellent in an enveloped casting property in a light metal alloy.

(2) The iron based sintered body in the above item (1), in which the surface is subjected to a shot blast treatment.

(3) The iron based sintered body in the above item (2), in which the surface is further subjected to a steam treatment after the shot blast heatment.

(4) The iron based sintered body in any one of the above items (1) to (3), in which the matrix has a pearlite structure.

(5) The iron based sintered body in any one of the above items (1) to (4), in which the structure further comprises free graphites dispersed in the matrix.

(6) The iron based sintered body in any one of the above items (1) to (5), in which the pores are isolated each other or are partially connected each other.

(7) The iron based sintered body in any one of items (1) to (6), in which a volume ratio of the pores relative to a total volume of the sintered body is 5 to 35% by volume.

(8) The iron based sintered body in any one of the above items (1) to (7), in which the structure further comprises 0.1 to 5% by mass of fine particles for improving machinability having a particle diameter of 150 µm or less and comprising at least one element selected from the group consisting of MnS, $CaF_2$, BN and enstatite.

(9) The iron based sintered body in any one of the above items (1) to (8), in which the composition comprises in % by mass, an amount of 40% or less in total of at least one element selected from the group consisting of 30% or less of Cr, 10% or less of Mo, 3% or less of Ni, 3% or less of Si, 2.5% or less of Mn, 5% or less of V, 5% or less of Ti, 3% or less of Nb and 5% or less of W

(10) The iron based sintered body in an item (9), in which the matrix has any one of a bainite structure, a martensite structure and a mixed structure thereof.

(11) The iron based sintered body in any one of the above items (1) to (10), having a groove formed on any one of end faces and side faces or both.

(12) The iron based sintered body in any one of the above items (1) to (11), in which the thermal expansion coefficient after being enveloped in an aluminum alloy by casting is $15.0\times10^{-6}/°$ C. or less as an average thermal expansion coefficient from room temperature to 200° C.

(13) A light metal alloy member enveloping the iron based sintered body according any one of the above items (1) to (12) by casting.

(14) A method for producing an iron based sintered body used for being enveloped in a light metal alloy by casting comprising the steps of preparing mixed powder by blending an iron based powder, a copper powder, a graphite powder and a lubricant powder; filling the mixed powder into a mold; forming a green compact by press-molding; and forming a sintered body by sintering the green compact, wherein a pure iron powder is used as the iron based powder, the copper powder and the graphite powder are blended so that the Cu content is 5 to 40% by mass and C content is 0.5 to 2.5% by mass relative to the total amount of the iron based powder, the copper powder and graphite powder in the mixed powder, at least any one of the molding condition of the green compact and sintering condition of sintering is controlled so that the average thermal expansion coefficient of the sintered body is $13.5\times10^{-6}/°$ C. or less from room temperature to 200° C.; and the surface roughness Rz is adjusted to 10 to 100 μm.

(15) The method for producing the iron based sintered body in the above item (14), in which any one of a ferritic stainless steel powder, a martensitic stainless steel powder, pure iron powder and ferritic stainless steel powder, pure iron powder and a martensitic stainless steel powder is used as the iron based powder, instead of the pure iron powder.

(16) The method for producing the iron based sintered body in any one of the above item (14) and (15), wherein further comprises a step of applying a steam treatment after the shot blast treatment.

(17) The method for producing the iron based sintered body in any one of the above item (14) to (16), wherein the mixed powder contains, relative to the total amount of the mixed powder of iron based powder, copper powder, graphite powder and fine particle powder for improving machinability in the mixed powder, 0.1 to 5% by mass of the fine particle powder for improving machinability comprising at least one element selected from the group consisting of MnS powder, $CaF_2$, powder, BN powder and enstatite powder with a particle diameter of 150 μm or less.

(18) The method for producing the iron based sintered body in any one of the above items (14) to (17), wherein the mixed powder is further blended any one of a Cr powder, Mo powder, W powder, Fe—Cr powder, Fe—Mo powder and Fe—W powder is blended, alone or in combination, as an alloy element powder so that the mixed powder comprises, in % by mass, 40% or less in total of at least one element selected from the group consisting of 30% or less of Cr, 10% or less of Mo, 3% or less of Ni, 3% or less of Si, 2.5% or less of Mn, 5% or less of V, 5% or less of Ti, 3% or less of Nb and 5% or less of W relative to the total amount of iron based powder, copper powder, graphite powder, fine particle powder for improving machinability and alloy element powder in the mixed powder.

(19) The method for producing the iron based sintered body in any one of the above items (14) to (18), wherein a groove is formed further on any one of end faces and side faces or both, of the green compact in the press-molding step.

(20) The method for producing the iron based sintered body in any one of the above items (14) to (19), wherein further grooves are formed on any one of end faces and side faces or both, of the green compact in the press-molding and in a succeeding machining step.

(21) The method for producing the iron based sintered body in any one of items (14) to (18), wherein a groove is formed further on any one of end faces and side faces or both, of the sintered body by machining after sintering.

(22) The method for producing the iron based sintered body according to claim 14, wherein the surface roughness Rz is adjusted by applying a shot blast treatment to the sintered body.

DESCRIPTION OF THE PREFERRED EMBODIMENTS

Figure 1A:
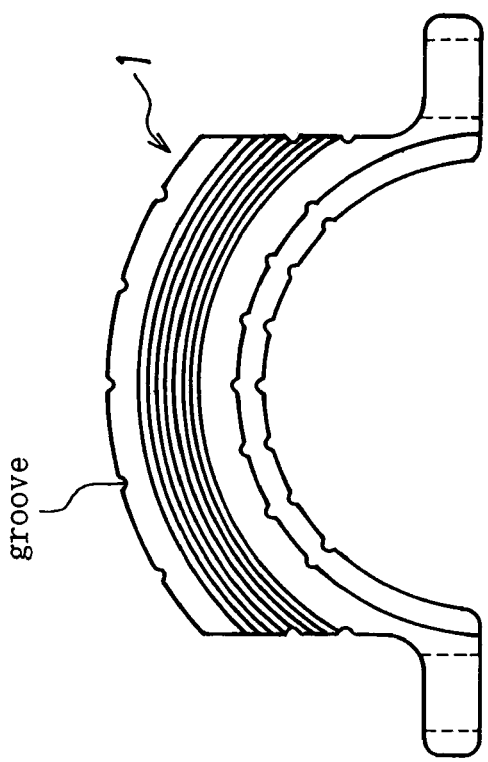
FIGS. 1A and 1B schematically show examples of the shape of the iron based sintered body used in the examples and FIG. 2 schematically shows the structure in the vicinity of the bearing of the internal combustion engine used in the examples.
Figure 1A:
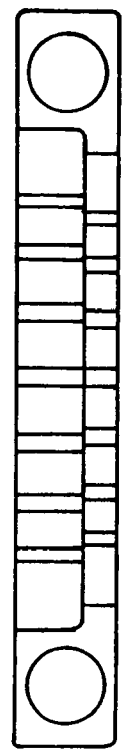

The art described in JP-A 60-219436 involved a restriction in designing arising from a problem that it is difficult to join the iron based material and an aluminum alloy without leaving any gaps, in addition to the problems that selection of iron based materials is necessary for controlling the bearing to have a desired thermal expansion coefficient. It is also a problem that production cost is forced to rise due to a requirement that the iron based material and aluminum alloy having different hardness with each other should be simultaneously machined. Furthermore, the iron based material which is enveloped by casting should be machined with high precision for arranging the iron based material at a desired position in a casting mold with high precision, which lead to additional increase of the production cost. A complex process is required for surface treatment such as aluminum plating on the surface of the iron based material in order to join the iron based material and aluminum alloy without any gaps, which leads to a further increase of the production cost.

In the art disclosed in JP-U No. 63-150115, it is a problem that the condition for compounding the reinforced fibers is quite severe although reinforced fibers are not exposed to the outer surface. For compounding the reinforced fibers which are ceramic or metal fibers, by impregnation of the aluminum alloy, it is required that the fibers should be heated at a high temperature, and a molten aluminum alloy should be injected under a high pressure. Consequently, the production cost is forced to be increased while making the cast process complex and difficult. A desired strength of the member cannot be ensured when the density of the reinforcing fibers is decreased for making the composite process easy. The reinforcing fibers are readily broken to make handling before enveloping casting difficult. In addition, it is a problem that the machinability of the composite member is decreased because the reinforced fiber is a porous material. The quite expensive reinforced fiber also leads to a large increase of the production cost of the sintered body.

When a composite member impregnated with the aluminum alloy is produced by using a porous metal molded body disclosed in JP-A No. 2001-276961, it is required for the aluminum alloy to be impregnated deep into the porous metal molded body for compounding, in order to stably obtain and satisfactory characteristics. For this purpose, the porous metal molded body should be preheated at a high temperature.

The production cost is also forced to be increased in the art disclosed in JP-B No. 2-30790, since a composite production process is necessary for an intermetallic compound forming treatment.

When the porous sintered body is enveloped in light weight metal alloy by casting, it is generally known that impregnation state of the molten light metal alloy after enveloping casting largely affects mechanical and physical properties of the resultant composite. Accordingly, cast conditions are often restricted in order to reduce the effect of impregnation state of the molten light metal alloy after enveloping casting.

An object of the present invention is to solve the problems in the conventional art described above, and to provide an iron based sintered body excellent in enveloped casting properties in the light metal alloy and a method for producing the same. The iron based sintered body as an object of the invention is low in price and has a higher strength than a light metal alloy such as an aluminum alloy while having good machinability. Furthermore, the iron based sintered body which is an object of the invention is able to have a high bonding strength with the light metal alloy and has a higher strength and a lower thermal expansion coefficient than the light metal alloy after being enveloped in the light metal alloy such as an aluminum alloy by casting. Another object of the invention is to simplify the production process of members using the iron based sintered body, and to provide an iron based sintered body that is responsible for reducing the material cost.

For attaining the objects above, the inventors have made intensive studies on various factors affecting on enveloped casting property in the light metal alloy such as the aluminum alloy. The inventors have found that the enveloped casting property in the light metal alloy of the iron based sintered body and the bonding strength between the iron based sintered body and the light metal alloy is remarkably improved by allowing the iron based sintered body to have a structure containing a free Cu phase dispersed in the matrix, and by adjusting the surface roughness of the iron based sintered body in a specified range by applying a shot blast treatment or further applying a steam treatment.

The present invention have been completed based on the discoveries above and further studies.

The iron based sintered body of the present invention has a composition of the matrix comprising, in % by mass, 0.5 to 2.5% of C and 5 to 40% of Cu, or further containing 40% or less in total of the one or more elements selected from the group of consisting of 30% or less of Cr. 10% or less of Mo, 3% or less of Ni, 3% or less of Si, 2.5% or less of Mn, 5% or less of V, 5% or less of Ti, 3% or less of Nb and 5% or less of W and the balance being Fe and inevitable impurities.

The reason of restriction of the composition of the iron based sintered body will be described below. In the composition, "% by mass" is abbreviated as "%" hereinafter.

C: 0.5 to 2.5%

C is an element for enhancing the strength and hardness of the sintered body, and 0.5% or more of C is required for ensuring the strength and for forming a matrix having a pearlite structure excellent in machinability. However, coarse carbide is formed when the content of C exceeds 2.5% to result in a decrease of machinability. Accordingly, the content of C is restricted in the range of 0.5 to 2.5%.

Cu: 5 to 40%

Cu enhances the strength of the iron based sintered body by solid solution in the matrix. In addition, Cu is precipitated as a free Cu phase in the matrix, and reacts with the light metal alloy when the iron based sintered body is enveloped in the light metal alloy by casting. Thereby, the bonding strength between the iron based sintered body and light metal alloy is increased. Substantially the precipitation of the free Cu phase is not observed when the Cu content is less than 5% to fail in obtaining a desired bond strength. When the content of Cu exceeds 40%, on the other hand, mechanical properties such as strength is decreased. Accordingly, the content of Cu is restricted in the range of 5 to 40%, preferably in the range of 10 to 30%.

40% or less in total of one or more elements selected from the group consisting of 30% or less of Cr, 10% or less of Mo, 3% or less of Ni, 3% or less of Si, 2.5% or less of Mn, 5% or less of V, 5% or less of Ti, 3% or less of Nb and 5% or less of W.

Cr, Mo, Ni, Si, Mn, V, Ti, Nb and W are elements for enhancing the strength of the iron based sintered body, and at least one of them may be added, if necessary. However, when more than 30% of Cr, 10% of Mo, 3% of Ni, 3% of Si, 2.5% of Mn, 5% of V, 5% of Ti, 3% of Nb and 5% of W are added, sintering becomes difficult and the strength of the iron based sintered body is decreased. Particularly, when Cr, V and W exceeding the above contents are added, machinability is decreased as a result of coarsening of carbides. The content of silicone oxide increases by adding Si in an content exceeding the above content to result in a decrease of the melting point as well as deterioration of machinability. When the total content of these elements exceeds 40%, the strength is decreased since the alloy elements are difficult to be uniformly distributed. Cr, Mo, Si, V, Ti, Nb and W are suitable for controlling the thermal expansion coefficient of the iron based sintered body, since these elements have smaller thermal expansion coefficients than Fe.

The balance except the components above is Fe and inevitable impurities in the composition of the matrix of the iron based sintered body of the present invention.

The iron based sintered body of the invention has the composition as described above and further between of the porosity, the matrix structure and free Cu phases dispersed in the matrix. Free graphite phases may be dispersed in the matrix with a volume ratio of 2% or less.

Preferably, the matrix has a pearlite structure in the iron based sintered body of the present invention, since the pearlite structure of the matrix permits machinability of the sintered body to be improved. The matrix structure may be a sorbite or troostite structure instead of the pearlite structure from the view point of machinability. A bainite structure, a martensite structure and a mixed structure thereof may be also acceptable without any problems.

The free Cu phase dispersed in the matrix preferably accounts for 5 to 30% in volume ratio. The volume ratio of the free Cu phase of as small as less than 5% results in a decrease of the bonding strength since a small amount of an intermetallic compound of Cu and the light metal alloy is formed. When the volume ratio of the free Cu phase is as large as more than 30%, on the other hand, the bonding strength is rather decreased since the strength of the iron based sintered body is reduced to below the strength of the light metal alloy.

Increasing the volume ratio of the free Cu phase dispersed in the matrix permits the intermetallic compound to be formed by a reaction of the molten light metal alloy with free Cu phase when the sintered body is enveloped in the light metal alloy by casting. According to this mechanism, many bonding points are formed and a high bonding strength may be obtained even if the molten light metal alloy does not impregnate deep into the iron based sintered body.

While the iron based sintered body contains many pores, they are preferably formed as isolated each other or partially connected pores. The "partially connected pores" as used herein refers to pores which are connected each other or one another, but are not connected with more pores. The term "isolated pores or partially connected pores" as used herein means that the value defined by [(the volume of fully connected pores)/(the total volume of pores)×100 (%)] is 50 or less. The pores are considered to be continuous when the value defined above is larger than 50. The total volume of the pores may be determined by converting the density measured by the Archimedes method. The volume of the fully connected pores can be determined by allowing a wax to permeate into the sintered body by immersing the sintered body in a liquid wax for 60 minutes, and by calculating the changes of the weight before and after permeation.

The isolated pores or partially connected pores can prevent the molten alloy from impregnating deep into the iron based sintered body when the sintered body is enveloped in the alloy by casting. Consequently, the characteristics of the iron based sintered body is less deteriorated by impregnation of the light metal alloy to enable the strength and thermal expansion coefficient inherent to the iron based sintered body to be maintained.

The porosity of the iron based sintered body of the invention is preferably 5 to 35% by volume. A large molding pressure is required for press-molding when the porosity is less than 5% by volume. Accordingly, the process is economically disadvantageous since a large size molding machine is necessary while decreasing productivity. When the porosity exceeds 35% by volume, on the other hand, the cast light metal alloy impregnates so deep into the iron based sintered body that characteristics of the iron based sintered body is deteriorated. The porosity is determined by measuring the density of the sintered body by the Archimedes method followed by converting into the volume % of the pores.

Fine particles for improving machinability are preferably dispersed in the matrix having above mentioned composition of the iron based sintered body of the invention for improving the machinability. Preferably, the dispersed fine particles for improving machinability are at least one element selected from the group consisting of MnS, $CaF_2$, BN and enstatite. Particles of MnS, $CaF_2$, BN and enstatite are able to improve machinability, and they may be added by selecting depending on the requirements.

The cutting resistance is maintained low by uniformly dispersing the fine particles in the matrix for improving machinability, since chips during the cutting is divided into a size determined by the distance between these fine particles.

The fine particles for improving machinability dispersed in the matrix preferably has a particle diameter of 150 $\mu$m or less. The boundary strength is decreased when the particle diameter of the fine particles for improving machinability exceeds 150 $\mu$m. The preferable diameter of fine particles for improving machinability is in the range of 5 to 100 $\mu$m.

The content of the fine particles for improving machinability dispersed in the matrix of the porous metal sintered body is preferably 0.1 to 5% by mass relative to the whole quantity of the mixed powder, or to the total amount of the iron based powder, copper powder, alloy element powder, graphite powder and fine particles for improving machinability. No machinability improving effect is observed when a content of the fine particles for improving machinability is less than 0.1% by mass. On the other hand, the adhesive strength of the light metal alloy to the matrix as well as the adhesive strength at the boundary are decreased when the content exceeds 5% by mass. Accordingly, the content of the fine particles for improving machinability with a particle diameter of 150 $\mu$m or less is in the range of 0.1 to 5% by mass.

The iron based sintered body of the invention has a surface roughness Rz of 10 to 100 $\mu$m. The surface area is not sufficiently increased when Rz is less than 10 $\mu$m to fail in obtaining sufficient adhesive property and bonding strength between the sintered body and light metal alloy. On the other hand, when the surface is rough with Rz of exceeding 100 $\mu$m, size accuracy becomes insufficient and the surface layer tends to generate cracks, then the adhesive property and bonding strength is decreased.

Figure 1B:
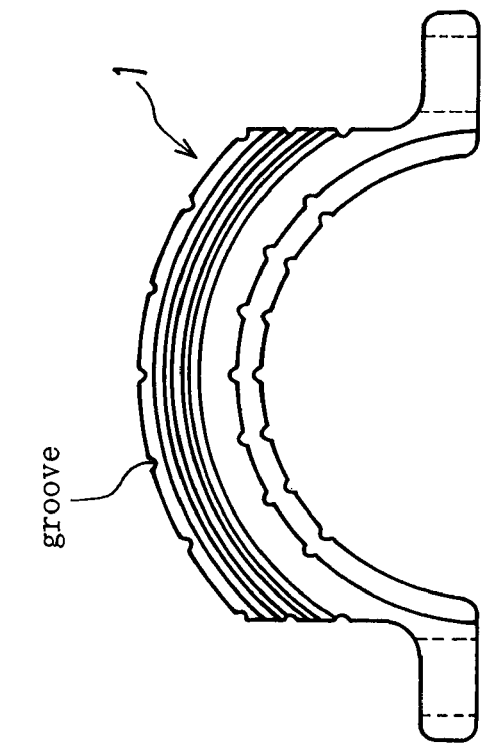
Figure 1B:
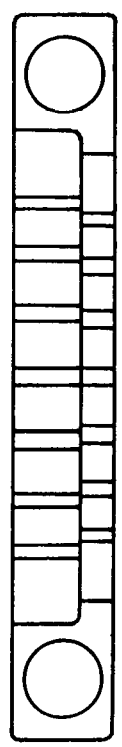

Preferably, the iron based sintered body of the invention has grooves on the end faces and/or side faces as shown in FIGS. 1A and 1B in addition to having a surface roughness as described above. Forming the grooves on the end faces and/or side faces permits the surface area to be increased while further improving the adhesive property and bonding strength between the molten light metal alloy and iron based sintered body. The grooves on the end faces and/or side faces are preferably formed at the stage of compressed molding, and/or in the machining process of the green compact or the sintered body. While the shape of the groove is not particularly restricted, it is preferably V-shape or arc shape. The number of the grooves may be appropriately selected depending on the thickness, shape and size of the sintered body as shown in FIGS. 1A and 1B.

The iron based sintered body of the invention having the composition and structure as described above has an average thermal expansion coefficient of $13.5 \times 10^{-6}/°$ C. or less from the room temperature to 200° C. The iron based sintered body may have an average thermal expansion coefficient of $15.0 \times 10^{-6}/°$ C. or less even after the light metal alloy has impregnated into the partially connected pores of the iron based sintered body, provided that the original average thermal expansion coefficient of the iron based sintered body is $13.5 \times 10^{-6}/°$ C. or less from room temperature to 200° C. Consequently, the thermal expansion coefficient of the iron based sintered body of the invention comes close to the thermal expansion coefficient of an iron based crank shaft of an internal combustion engine, which is $9 \times 10^{-6}$ to $12 \times 10^{-6}$/K. Accordingly, the thermal expansion of the bearing during operation of the internal combustion engine can be suppressed when the iron based sintered body is enveloped in the bearing of the internal combustion engine by casting. This is effective for properly maintaining the change of clearance between the bearing and crank shaft caused by a difference of the thermal expansion coefficients between them.

The method for producing the sintered body of the invention will be described below.

An iron based powder, a copper powder, a graphite powder and a lubricant powder, optionally fine particle powder for improving machinability, are mixed to form a mixed powder. The mixed powder is filled in a mold to form a green compact by press-molding, or compression molding. And then, the green compact is sintered to form a sintered body.

The iron based powder used is preferably a pure iron powder and/or a stainless steel powder. The stainless steel powder is preferably a ferritic stainless steel powder or a martensitic stainless steel powder.

Examples of the ferritic stainless steel are SUS 430, SUS 410L and SUS 434. A representative composition thereof preferably comprises, in % by mass, 0.12% or less of C, 1.0% or less of Si, 1.25% or less of Mn, 11 to 18% of Cr and 1.25% or less of Mo, and optionally at least one element selected from the group consisting of 3% or less of Ni, 5% or less of V, 5% or less of Ti, 3% or less of Nb and 5% or less of W, and the the balance being Fe and inevitable impurities.

Examples of the martensitic stainless steel are SUS 420, SUS 410 and SUS 416. A representative composition thereof preferably comprises, in % by mass, 0.4% or less of C, 1.0% or less of Si, 1.25% or less of Mn and 11.5 to 14% of Cr, and optionally at least one element selected from the group consisting of 3% or of Ni, 5% or less of V, 5% or less of Ti, 3% or less of Nb and 5% or less of W, and the balance being Fe and inevitable impurities.

A pure copper powder is preferably used as the raw material of the copper powder. The copper powder is added so that the content of Cu in the mixed powder is 5 to 40% by mass relative to the total content of the iron based powder, alloy element powder, copper powder, graphite powder and fine particle powder for improving machinability. No precipitation of free Cu is observed when the copper content is less than 5% by mass in the mixed powder. On the other hand, mechanical properties such as strength are decreased when the copper content exceeds 40% by mass. Accordingly, the content of Cu in the mixed powder is adjusted in the range of 5 to 40% by mass, preferably in the range of 10 to 30%.

The graphite powder is added as the alloy element for enhancing the strength of the iron based sintered body and for improving machinability by forming the matrix structure into the pearlite structure. To obtain these effects, graphite is added so that the content of C in the mixed powder becomes 0.5 to 2.5% by mass.

The lubricant powder is added in the mixed powder for improving moldability in the compression molding process and for increasing the density of the green compact. Zinc stearate is preferable as the lubricant powder. The content of the lubricant powder in the mixed powder is preferably 0.5 to 5 parts by weight relative to 100 parts of the whole quantity of mixed powder. The whole quantity of the mixed powder is the total amount of the iron based powder, copper powder, alloy element powder, graphite powder and fine particle powder for improving machinability.

The fine particle powder for improving machinability may be also added to the mixed powder in addition to the iron based powder, copper powder, graphite powder and lubricant powder in order to improve machinability. The fine particle powder for improving machinability is preferably at least one element selected from the group consisting of MnS, $CaF_2$, BN and enstatite powders. The MnS, $CaF_2$, BN and enstatite powders are able to improve machinability, and they are selectively added if necessary. The fine particles for improving machinability preferably has a particle diameter of 150 $\mu$m or less. The bondary strength decreases when the particle diameter of the fine particles powder for improving machinability exceeds 150 $\mu$m. The preferable diameter of the fine particles powder for improving machinability is in the range of 5 to 100 $\mu$m. The preferable content of the fine particle powder for improving machinability in the mixed powder is, if any, 0.1 to 5% by mass relative to the total amount of the iron based powder, copper powder, alloy element powder, graphite powder and fine particle powder for improving machinability. The machinability improving effect cannot be obtained when the content of the fine particle powder for improving machinability is less than 0.1% by mass, while the boundary strength is decreased when the content of the fine particle powder for improving machinability exceeds 5% by mass.

Preferably, at least one of the powders selected from the group consisting of the Cr powder, Mo powder, W powder, Fe—Cr powder, Fe—Mo powder and Fe—W powder are further blended in the mixed powder above, alone or in combination, as the alloy element powder so that the total content thereof is 40% or less relative to the total amount of the iron based powder, alloy element powder, copper powder, graphite powder and machinability improving powder, whereby the mixed powder contains, in % by mass, 40% or less in total of one or more element selected from the group consisting of 30% or less of Cr, 10% or less of Mo, 3% or less of Ni, 3% or less of Si, 2.5% or less of Mn, 5% or less of V, 5% or less of Ti, 3% or less of Nb and 5% or less of W.

Preferably, the Cr powder, Mo powder, W powder, Fe—Cr powder, Fe—Mo powder and Fe—W powder are blended for improving the strength and decreasing the thermal expansion coefficient of the sintered body so that the blending amount is 40% or less in total in the mixed powder. The alloy elements are unevenly distributed and the strength of the sintered body decreases when the blending amount of these powders exceeds 40%.

While the mixing method is not particularly restricted, a V-mill is preferably used for economical reasons.

The mixed powder is filled in a mold for press-molding or compression-molding to obtain a green compact having a desired shape. The press-molding conditions of the green compact is preferably adjusted so that the sintered body has an average thermal expansion coefficient of $13.5 \times 10^{-6}/°$ C. or less from room temperature to 200° C. While the method for molding the mixed powder is not particularly restricted, a press-machine is preferably used. Preferably, the shape of the mold is previously designed so that grooves are formed on side faces and/or end faces of the green compact.

Then, the green compact is sintered at 1100 to 1250° C. to form a sintered body.

The sintering condition is preferably adjusted so that the sintered body has an average thermal expansion coefficient of $13.5 \times 10^{-6}/°$ C. or less from room temperature to 200° C. A reducing atmosphere is preferable for accelerating the sintering process. The sintering condition is preferably adjusted so that partially liquid-phase sintering is performed in order to form a sintered body containing isolated or partially connected pores. This method permits the pores to be isolated or partially connected since the pores are plugged with the free Cu phase.

Subsequently, the sintered body is subjected to a shot blast treatment to have a surface roughness Rz of 10 to 100 $\mu$m. The diameter of shot particles and blowing pressure are controlled for adjusting the surface roughness. The surface is cleaned by removing surface oxidation films and the free Cu phase dispersed in the matrix is exposed to the surface by applying the shot blast treatment. Consequently, wettability between the surface of the sintered body and molten light metal alloy is improved to enable the reaction between the surface and molten alloy to be enhanced. The adhesive property is improved since bonding is formed with no interface gaps between the light metal alloy and the sintered body. The boundary strength is also improved due to an additional anchor effect as a result of the improvement of the adhesive property. The pores exposed to the surface are crushed by applying the shot blast treatment to enable the molten light metal alloy to be prevented from permeating into the sintered body during the enveloped casting process. Accordingly, the characteristics of the sintered body itself may be maintained after enveloped casting. However, no shot blast treatment is required when the surface roughness of the sintered body satisfies the range described above after sintering.

The steam treatment is preferably applied to the sintered body subsequent to the shot blast treatment. Preferably, the steam treatment is applied at 550 to 650° C. for 30 to 90 minutes in a steam atmosphere. An iron oxide coating film is formed on the surface and exposure of free Cu on the surface because remarkable due to this steam treatment, which further accelerates the reaction between the sintered body and molten light metal alloy to enable the interface to be bonded without leaving any gaps, thus improving the adhesive property. The pores in the vicinity of the surface of the sintered body is plugged by this steam treatment to prevent a large quantity of the molten light metal alloy from permeating deep into the sintered body by casting, and the characteristics of the iron based sintered body is maintained after the enveloped casting.

The iron based sintered body of the invention is mounted on a corresponding site in a casting mold for forming the bearing of the internal combustion engine, and a light metal alloy member is produced by a high pressure die-casting by injecting the molten light metal alloy, for example a molten aluminum alloy, into the casting mold. The light metal alloy member is processed into a final product by machining it into a prescribed size.

The iron based sintered body produced by the method as described above is mounted on a corresponding site in a casting mold, and the light metal alloy member is produced by the high pressure die-casting by injecting the molten light metal alloy. Preheating at a temperature of as high as 500 to 550° C. that has been inevitable in the conventional iron based sintered body is no more required in the iron based sintered body according to the invention. Instead, preheating at room temperature or up to 200° C. is sufficient for the iron based sintered body of the invention. The molten light metal alloy can be injected with good circulation into the casting mold with the iron based sintered body of the invention without preheating or with preheating at a low temperature, so that good adhesive property and bonding strength between the molten light metal alloy and sintered body may be ensured. Consequently, the production process of the light metal alloy member enveloping the iron based sintered body by casting may be simplified and the manufacturing cost of the light metal alloy member may be decreased.

EXAMPLES

A mixed powder was prepared by mixing with kneading a pure iron powder as an iron based powder, a pure copper powder as a copper powder, a graphite powder, a zinc stearate powder as a lubricant powder and a MnS powder as a fine particle powder for improving machinability was further added to the mixed powder. The blending ratio of each powder in the mixed powder is shown in Table 1.

The mixed powder was filled in a mold and was press-molded into a green compact having a shape as shown in FIG. 1A. Grooves being a depth of 0.5 mm were formed on end faces and side faces of a part of the green compact as shown in FIG. 1A. A green compact having a shape according to JIS Z2550 was formed as a tensile strength test piece. A green compact with a dimension of 50 mm in diameter and 15 mm in length was also prepared as a test piece for measuring a bonding strength after enveloped casting.

A sintered body was produced by liquid-phase-sintering each of the green compact under an appropriate condition depending on the content of Cu. The sintered body obtained was further subjected to a shot blast treatment and additional steam treatment, if necessary. The shot blast treatment was carried out using a steel grid prescribed in JIS G70 at a blowing pressure of 0.049 MPa (5 kgf/cm$^2$). The steam treatment was carried out at 550° C. for 90 minutes.

The composition, content of free Cu phase, structure, porosity, shape of the pore, tensile property, thermal expansion coefficient and surface roughness were measured with respect to the sintered body obtained.

For measuring the content of free Cu, a test piece was sampled from the sintered body. After polishing the cross section of the test piece was observed with Electron Probe Micro-Analyzer, and the content of the free Cu phase was measured using an image analysis software. After the cross section of the test piece was etched by Nital acid or marble etching, the structure was observed and the structure of the matrix was identified.

The porosity was determined by converting the density of the sintered body measured by the Archimedes method into the volume % of pores.

Shape of the pores was determined by measuring the amount of the fully connected pores in the sintered body. The pores were decided to be isolated or partially connected when the value defined by [(the amount of the fully connected pores)/(total amount of the pores)]×100 (%) is 50 or less, while the pores were decided to be continuous when the value exceeds 50. The sintered body was immersed in liquid wax for 60 minutes, and the amount of the fully connected pores was determined by measuring the amount of permeated wax after degreasing the permeated wax. The total amount of the pore was determined by converting the density of the sintered body measured by the Archimedes method into the porosity.

For measuring the tensile strength, a sample piece for the tensile strength test was prepared according to the prescription in JIS Z2550. The tensile strength was evaluated as a tensile strength ratio. Using the tensile strength of ADC12 aluminum alloy as a reference (1.0), the tensile strength ratio is defined as (tensile strength of the sintered body)/(tensile strength of ADC 12 aluminum alloy).

The thermal expansion coefficient was measured the average thermal expansion coefficient from room temperature to 200° C. The surface roughness Rz ($\mu$m) was measured with a needle-probe type surface roughness meter according to JIS B0601-1994.

The stainless steel powder shown in Table 1 was used instead of the pure iron powder (A) in some of the sintered bodies. The stainless steel powder used was (B) a ferritic stainless steel powder (SUS 430) or (C) martensitic stainless steel powder (SUS 410L). In some of the sintered bodies, the sintered bodies, were produced by further blending in the mixed powder at least one powder selected from the group consisting of (a) Cr powder, (b) Mo powder, (c) W powder, (d) Fe—Mo powder, (e) Fe—Cr powder or (f) Fe—W powder.

Figure 2:
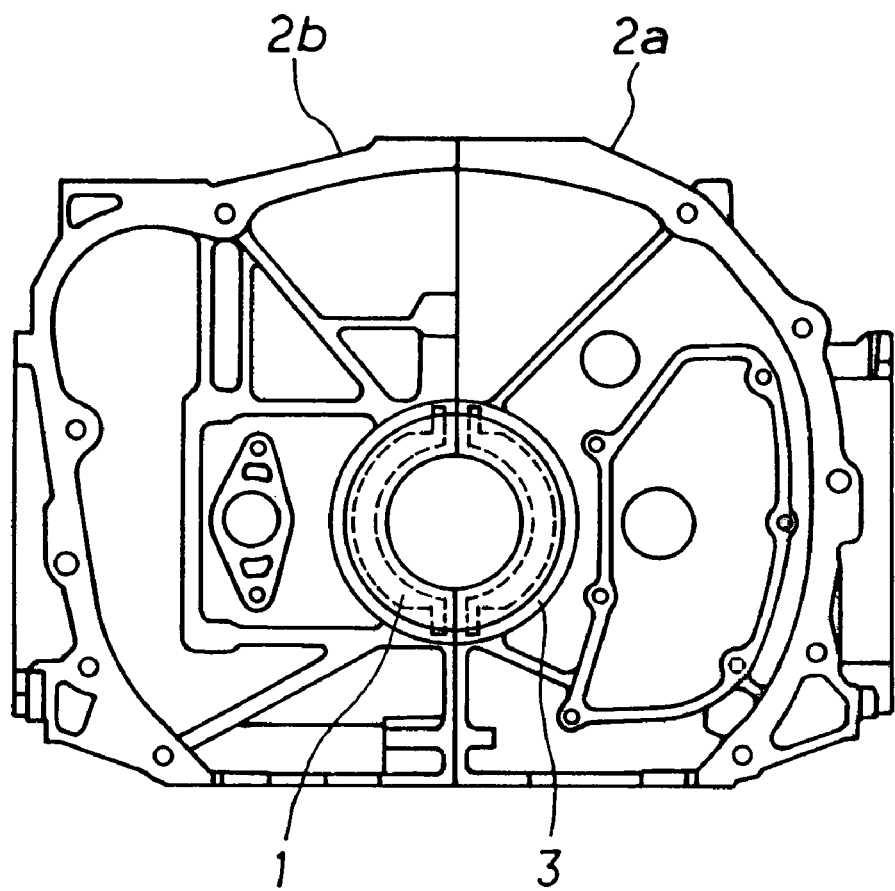

The iron based sintered body obtained as described above was mounted at a prescribed site of the casting mold of the bearing 3 of an internal combustion engine as a reinforcing member 1 as shown in FIG. 2. The iron based sintered body was not preheated, or preheated at 200° C. before mounting on the casting mold. Then, the molten aluminum alloy (JIS ADC12) was injected by high pressure die-casting to form the internal combustion engine blocks 2a and 2b having prescribed sizes.

A tensile strength test piece including the interface between the sintered body and aluminum alloy was sampled from the bearing of the internal combustion engine obtained to measure the tensile strength. The tensile strength test piece was sampled in the direction containing the interface that is vertical to the axis of the test piece. The tensile strength $\sigma$ was evaluated as a bonding strength ratio relative to the desired interface strength $\sigma_E$, ($\sigma/\sigma_E$). $\sigma_E$ represents the interface strength between aluminum plated cast iron being enveloped in the aluminum alloy by casting and aluminum ally. A test piece including the sintered body was sampled from the bearing of the internal combustion engine, and the average thermal expansion coefficient was measured from room temperature to 200° C. using a thermal expansion coefficient measuring apparatus. An improvement of 30% of productivity and a decrease of 50% of the production cost were attained by omitting preheating of the sintered body, or by using the sintered body being preheated at a low temperature, when the sintered body was enveloped in the aluminum alloy by casting, as compared with the case of usual cast iron being enveloped in the aluminum alloy by casting.

The results obtained are shown in Table 2.

All the samples in the examples of the invention show a tensile strength ratio of as high as 1.0 or more, and a bonding strength ratio of as high as 1.0 even if no preheating or preheating at a low temperature before enveloped casting in the aluminum alloy was conducted. The thermal expansion coefficient of the bearing member after enveloping in the aluminum alloy by casting is $15.0 \times 10^{-6}/°$ C. or less in the examples of the invention, which is close to the thermal expansion coefficient of the iron based material.

On the other hand, the tensile strength ratio is low, the bonding strength ratio is low, and the thermal expansion coefficient is large in the samples in the comparative examples that are out of the range of the invention. Consequently, the thermal expansion coefficient of the bearing in which the iron based sintered body is enveloped by casting, cannot be suppressed when the internal combustion engine is in operation to fail in properly maintaining the change of clearance between the bearing and the crank shaft, thereby involving a risk of generating noise and vibration.

The invention is able to exert industrially remarkable effects such that the iron based sintered body of the invention having excellent mechanical properties such as a high tensile strength as compared with light metal alloys such as an aluminum alloy, and having excellent in enveloped casting property in the light metal alloy can be cheaply and readily produced. The iron based sintered body of this invention is excellent in the adhesive property and has high the boding strength with the light metal such as an aluminum alloy so that the interface between the light metal and the sintered body is bonded without leaving any gaps after enveloped casting in the light metal. Furthermore, the iron based sintered body of the invention can maintain a high strength and low thermal expansion coefficient relative to the light metal alloy even after enveloped casting in the light metal alloy. The iron based sintered body of the invention requires no preheating, or preheating at a low temperature of as low as about 200° C., before being enveloped in the light metal alloy by casting. Consequently, the production process of the member may be simplified to enable the production cost of the internal combustion engine members to be remarkably reduced as compared with the usual process. In addition, there is another benefit that the change of clearance between the bearing and the crank shaft may be properly maintained during operation of the internal combustion engine, when the iron based sintered body of this invention is enveloped in the bearing of the internal combustion engine by casting.

TABLE 1

| | | MIXED POWDER | | | | | |
|---|---|---|---|---|---|---|---|
| | | Other Alloy Element Powder | | | | Fine Particle Powder For Improving machinability | |
| Mixed Powder No. | Iron Based Powder Kind* | Kind**:Amount Of Blending (% By Mass) | Graphite Powder, % By Mass | Copper Powder, % By Mass | Kind *** | Mean Particle Diameter μm | Amount Of Blending, % By Mass |
| 1 | A | — | 1.0 | 10 | — | — | — |
| 2 | | — | 1.5 | 10 | — | — | — |
| 3 | | — | 1.5 | 15 | — | — | — |
| 4 | | — | 1.5 | 20 | — | — | — |
| 5 | | — | 0.8 | 4 | — | — | — |
| 6 | | — | 0.4 | 20 | — | — | — |
| 7 | | — | 3.0 | 20 | — | — | — |
| 8 | | — | 0.5 | 45 | — | — | — |
| 9 | | — | 1.5 | 20 | I | 20 | 0.60 |
| 10 | | — | 1.5 | 20 | II | 30 | 0.60 |
| 11 | | — | 1.5 | 20 | III | 30 | 0.60 |
| 12 | | e:10 | 1.0 | 20 | I | 20 | 0.75 |
| 13 | | d:5, e:10 | 1.0 | 20 | I | 20 | 0.75 |
| 14 | | d:10 | 1.0 | 20 | I | 20 | 0.75 |
| 15 | | f:5 | 1.0 | 20 | I | 20 | 0.75 |
| 16 | | a:20 | 1.0 | 20 | I | 20 | 0.75 |
| 17 | | b:5 | 1.0 | 20 | I | 20 | 0.75 |
| 18 | | c:3 | 1.0 | 20 | I | 20 | 0.75 |
| 19 | | e:55 | 2.5 | 30 | I | 20 | 0.75 |
| 20 | | a:10, d:10, e:55 | 2.5 | 20 | I | 20 | 0.75 |
| 21 | B | — | 2.5 | 30 | I | 20 | 0.75 |
| 22 | C | — | 2.5 | 30 | I | 20 | 0.75 |
| 23 | B | e:50 | 2.5 | 30 | I | 20 | 0.75 |

*A: pure iron powder, B: SUS 410L, C: SUS 430
**a: Cr powder, b: Mo powder, c: W powder, d: Fe-Mo powder, e: Fe-Cr powder, f: Fe-W powder
***I: MnS, II: CaF2, III: enstatit

TABLE 2

| Sample No. | Mixed Powder No. | Shot Blast Tretment | Steam Treatment | Composition (Content, % By Mass) | | | | | Porosity, % By Volume | Shape Of Pore | Contents Of Particles For improving Machinabily, % By Mass |
|---|---|---|---|---|---|---|---|---|---|---|---|
| | | | | C | Cu | Other Elements | Total Contents Of Other Elements | Balance | | | |
| 1 | 1 | Yes | Yes | 0.9 | 10 | — | — | Fe | 15 | Isolated And Partially Connected | — |
| 2 | 2 | Yes | Yes | 1.4 | 10 | — | — | Fe | 14 | Isolated And Partially Connected | — |
| 3 | 3 | Yes | No | 1.4 | 14 | — | — | Fe | 14 | Isolated And Partially Connected | — |
| 4 | 3 | Yes | No | 1.4 | 14 | — | — | Fe | 14 | Isolated And Partially Connected | — |
| 5 | 3 | Yes | Yes | 1.4 | 14 | — | — | Fe | 14 | Isolated And Partially Connected | — |
| 6 | 4 | Yes | No | 1.4 | 18 | — | — | Fe | 13 | Isolated And Partially Connected | — |
| 7 | 4 | Yes | No | 1.4 | 18 | — | — | Fe | 13 | Isolated And Partially Connected | — |
| 8 | 4 | Yes | Yes | 1.4 | 18 | — | — | Fe | 13 | Isolated And Partially Connected | — |
| 9 | 4 | Yes | Yes | 1.4 | 18 | — | — | Fe | 13 | Isolated And Partially Connected | — |
| 10 | 4 | Yes | Yes | 1.4 | 18 | — | — | Fe | _4 | Isolated And Partially Connected | — |
| 11 | 4 | Yes | No | 1.4 | 18 | — | — | Fe | 40 | Continuous | — |
| 12 | 4 | Yes | No | 1.4 | 18 | — | — | Fe | 13 | Isolated And Partially Connected | — |
| 13 | 4 | Yes | No | 1.4 | 18 | — | — | Fe | 13 | Isolated And Partially Connected | — |
| 14 | 5 | Yes | No | 0.8 | _4 | — | — | Fe | 10 | Isolated And Partially Connected | — |
| 15 | 5 | Yes | Yes | 0.8 | _4 | — | — | Fe | 10 | Isolated And Partially Connected | — |
| 16 | 6 | Yes | Yes | 0.4 | 18 | — | — | Fe | 35 | Isolated And Partially Connected | — |
| 17 | 7 | Yes | Yes | 2.7 | 18 | — | — | Fe | 15 | Isolated And Partially Connected | — |
| 18 | 8 | Yes | No | 0.5 | 43 | — | — | Fe | 6 | Isolated And Partially Connected | — |
| 19 | 12 | Yes | No | 0.9 | 18 | Cr:6.0 | 6.5 | Fe | 15 | Isolated And Partially Connected | MnS:0.75 |
| 20 | 13 | Yes | No | 0.9 | 18 | Cr:6.0, Mo:2.5 | 8.5 | Fe | 15 | Isolated And Partially Connected | MnS:0.75 |
| 21 | 14 | Yes | No | 0.9 | 18 | Mo:5.0 | 5.0 | Fe | 15 | Isolated And Partially Connected | MnS:0.75 |
| 22 | 15 | Yes | No | 0.9 | 18 | W:2.5 | 2.5 | Fe | 15 | Isolated And Partially Connected | MnS:0.75 |
| 23 | 19 | Yes | No | 0.9 | 27 | Cr:30.0 | 30.0 | Fe | 34 | Isolated And Partially Connected | MnS:0.75 |
| 24 | 20 | Yes | No | 2.4 | 27 | Cr:40.0, Mo:5.0 | 45.0 | Fe | 34 | Isolated And Partially Connected | MnS:0.75 |
| 25 | 21 | Yes | No | 2.4 | 28 | Cr:8.5, Si:0.5, Mn:0.1 | 9.1 | Fe | 30 | Isolated And Partially Connected | MnS:0.75 |
| 26 | 22 | Yes | No | 2.4 | 28 | Cr:12.0, Si:0.5, Mn:0.1 | 12.6 | Fe | 30 | Isolated And Partially Connected | MnS:0.75 |
| 27 | 23 | Yes | No | 2.4 | 28 | Cr:30.0, Si:0.1 | 30.1 | Fe | 30 | Isolated And Partially Connected | MnS:0.75 |

| Sample No. | Sintered Body | | | | | Preheating | Properties After Enveloped Casting | | Note |
|---|---|---|---|---|---|---|---|---|---|
| | Free Cu Phase, Area % | Structure Of matrix *** | Surface Roughness Rz μm | Tensile Properties Tensile Strength* | Thermal Expansion Coefficient ×10$^{-6}$ K$^{-1}$ | Before Enveloped Casting Temperature °C. | Tensile Properties Bonding Strength Ratio**** | Thermal Expansion Coefficient ×10$^{-6}$ K$^{-1}$ | |
| 1 | 8 | P | 32 | 2.9 | 12.2 | RT | 1.0 | 12.3 | Example |
| | | | | | | 200 | 1.1 | 12.3 | |
| 2 | 8 | P | 33 | 2.9 | 12.1 | RT | 1.0 | 12.3 | Example |
| | | | | | | 200 | 1.1 | 12.3 | |
| 3 | 13 | P | 26 | 2.8 | 12.6 | RT | 1.0 | 12.8 | Example |
| | | | | | | 200 | 1.1 | 12.8 | |

TABLE 2-continued

| | | | | | | | | | |
|---|---|---|---|---|---|---|---|---|---|
| 4 | 13 | P | 44 | 2.8 | 12.6 | RT | 1.2 | 12.8 | Example |
| | | | | | | 200 | 1.2 | 12.8 | |
| 5 | 13 | P | 43 | 2.7 | 12.6 | 200 | 1.4 | 12.8 | Example |
| 6 | 17 | P | 25 | 2.6 | 13.2 | 200 | 1.1 | 13.5 | Example |
| 7 | 17 | P | 44 | 2.6 | 13.2 | 200 | 1.2 | 13.5 | Example |
| 8 | 17 | P | 45 | 2.6 | 13.2 | 200 | 1.5 | 13.5 | Example |
| 9 | 17 | P | 74 | 2.6 | 13.2 | 200 | 1.4 | 13.5 | Example |
| 10 | 18 | P | 42 | 3.1 | 12.9 | 200 | 0.8 | — | Comparative Example |
| 11 | 13 | P | 41 | 0.7 | 11.9 | 200 | 2.2 | 16.5 | Comparative Example |
| 12 | 17 | P | _8 | 2.6 | 13.2 | 200 | 0.9 | — | Comparative Example |
| 13 | 17 | P | 102 | 2.6 | 13.2 | 200 | 0.9 | — | Comparative Example |
| 14 | = | P | 45 | 3.3 | 11.9 | 200 | 0.5 | — | Comparative Example |
| 15 | = | P | 81 | 3.1 | 11.9 | 200 | 0.8 | — | Comparative Example |
| 16 | 16 | P | 48 | 0.9 | 12.0 | 200 | 2.1 | 16.3 | Comparative Example |
| 17 | 18 | P | 45 | 0.9 | 12.7 | 200 | 0.7 | — | Comparative Example |
| 18 | 43 | P | 51 | 0.8 | 15.1 | 200 | 1.2 | — | Comparative Example |
| 19 | 16 | P | 27 | 2.4 | 12.5 | 200 | 1.1 | 12.7 | Example |
| 20 | 16 | P | 26 | 2.2 | 12.2 | 200 | 1.1 | 12.5 | Example |
| 21 | 16 | P | 29 | 2.1 | 12.3 | 200 | 1.1 | 12.5 | Example |
| 22 | 16 | P | 31 | 2.1 | 12.3 | 200 | 1.1 | 12.4 | Example |
| 23 | 21 | M | 28 | 1.6 | 10.1 | 200 | 2.3 | 13.9 | Example |
| 24 | 15 | M | 24 | 0.8 | 10.4 | 200 | 2.3 | 12.7 | Comparative Example |
| 25 | 24 | M + B | 27 | 1.5 | 11.9 | 200 | 2.1 | 14.1 | Example |
| 26 | 24 | M + B | 33 | 1.5 | 11.1 | 200 | 2.1 | 13.9 | Example |
| 27 | 24 | M | 31 | 1.3 | 10.7 | 200 | 2.1 | 13.8 | Example |

*The tensile strength ratio is expressed by defining the strength of ADC 12 alloy as 1.0
***P: pearlite, B: bainite, M: martensite
****The bonding strength in the case of using aluminum plated cast iron is defined as 1.0

What is claimed is:

1. An iron based sintered body which is enveloped in a cast light metal alloy member, having a composition comprising, in % by mass, 0.5 to 2.5% of C, 5 to 40% of Cu, and the balance being Fe and inevitable impurities, a structure containing pores, said pores being isolated or partially connected to each other, wherein the value defined by [(the volume of fully connected pores)/(the total volume of pores)×100(%)] is 50 or less, and the volume ratio of the pores relative to a total volume of the sintered body is 13–35% by volume, and free Cu phases dispersed in a matrix, an average thermal expansion coefficient from room temperature to 200° C. of $13.5 \times 10^{-6}$/° C. or less, and a surface roughness Rz of 26 to 100 μm.

2. The iron based sintered body according to claim 1, wherein the surface is subjected to a shot blast treatment.

3. The iron based sintered body according to claim 2, wherein the surface further is subjected to a steam treatment after the shot blast treatment.

4. The iron based sintered body according to claim 1, wherein the matrix has a pearlite structure.

5. The iron based sintered body according to claim 1, wherein the structure further comprises free graphite phases dispersed in the matrix.

6. The iron based sintered body according to claim 1, wherein the composition further comprises 0.1 to 5% by mass of fine particles for improving machinability having a particle diameter of 150 μm or less and comprising at least one element selected from the group consisting of MnS, CaF$_2$, BN and enstatite.

7. The iron based sintered body according to claim 1, wherein the composition further comprises, in % by mass, an amount of 40% or less in total of at least one element selected from the group consisting of 30% or less of Cr, 10% or less of Mo, 3% or less of Ni, 3% or less of Si, 2.5% or less of Mn, 5% or less of V, 5% or less of Ti, 3% or less of Nb and 5% or less of W.

8. The iron based sintered body according to claim 7, wherein the matrix has any one of a bainite structure, a martensite structure and a mixed structure thereof.

9. The iron based sintered body according to claim 1, having a groove formed on any one of end faces and side faces or both.

10. The iron based sintered body according to claim 1, wherein the thermal expansion coefficient after the body is enveloped in an aluminum alloy by casting is $15.0 \times 10^6$/°C. or less as an average thermal expansion coefficient from room temperature to 200° C.

11. A light metal alloy member enveloping, by casting, the iron based sintered body according to claim 1.

* * * * *